United States Patent [19]
Sorsen

[11] 4,025,024
[45] May 24, 1977

[54] METHOD AND APPARATUS FOR ALIGNING STRIP END PORTIONS IN A CONTINUOUS STRIP OPERATION
[75] Inventor: Spencer L. Sorsen, Lake Bluff, Ill.
[73] Assignee: National Steel Corporation, Pittsburgh, Pa.
[22] Filed: Apr. 15, 1976
[21] Appl. No.: 677,175
[52] U.S. Cl. .................................. 226/3; 226/20; 226/110
[51] Int. Cl.² ....................................... B65H 23/02
[58] Field of Search ............. 226/3, 15, 18, 19, 20, 226/45, 109, 110; 228/47, 49

[56] References Cited
UNITED STATES PATENTS

| | | | |
|---|---|---|---|
| 3,370,771 | 2/1968 | Shay | 226/18 X |
| 3,446,933 | 5/1969 | Taylor | 226/19 X |

Primary Examiner—Richard A. Schacher
Attorney, Agent, or Firm—Shanley, O'Neil and Baker

[57] ABSTRACT

Method and apparatus for aligning strip end portions prior to a welding step in a continuous strip treating operation in which there is a first step running through the line having a trailing end portion and a second strip to be fed into the line having a leading end portion, the invention comprising means and steps for determining the longitudinal direction of the first strip trailing end portion, providing a laser beam which can be disposed parallel to the longitudinal direction of the first strip trailing end portion, providing a strip positioning member contiguous to the second strip leading end portion, the strip positioning member being laterally disposable, and utilizing the laser beam to dispose the strip positioning member in a predetermined position, whereby the second strip leading end portion can be aligned longitudinally and laterally with the first strip trailing end portion so that the strips can be welded together without the formation of a dog leg in the resulting welded strip.

24 Claims, 9 Drawing Figures

METHOD AND APPARATUS FOR ALIGNING STRIP END PORTIONS IN A CONTINUOUS STRIP OPERATION

RELATED PATENT APPLICATIONS

The invention covered by this patent application is an improvement on the invention covered by Application Ser. No. 677,170 filed by Crayton H. Schwestka on the same date as the present application and assigned to the same assignee.

BACKGROUND OF THE INVENTION

In continuous strip treating lines, such as continuous strip tinplating lines, it is customary to run the line continuously because of the difficulties encountered in stopping the strip which would result in a considerable length of strip remaining stationary in contact with the electroplating solution. There is thus required the provision of means for holding a second coil of strip in readiness to go through the line while the first coil is uncoiling, plus means for storing a sufficient length of moving strip so that strip can be paid out of the storage and through the plating line while the leading end of the new coil is being welded to the trailing end of the strip going through the line.

A difficulty plaguing this type of operation has been caused by the failure to align properly the trailing end portion of the running strip with the leading end portion of the strip from the new coil. Where such alignment is not present, a misalignment, called a dog leg, occurs between the trailing end of the running strip and the leading end of the new strip. This misalignment or dog leg causes difficulties in the plating line strip handling and coiling operations.

Elimination of dog leg has previously been proposed where the trailing end of the running strip is displaced laterally from the center line of the plating equipment by providing for lateral movement of the leading end portion of the new strip so as to bring the two strip ends into lateral and longitudinal alignment at the time of the welding operation. This development failed to take into account the fact that the trailing end portion of the running strip is sometimes disposed at an angle to the longitudinal center line of the electroplating line equipment.

Where it has been recognized that the running strip trailing end portion may be at an angle to the center line of the electroplating line equipment in the past, the proposed remedy has been to move the running strip trailing end portion after it has been stopped for the welding operation to bring the running strip trailing end portion into parallelism or alignment with the center line of the electroplating line equipment. In the latter development, the new strip leading end portion was also placed in parallelism or alignment with the longitudinal center line of the electroplating line equipment. After these operations, completion of the welding operation resulted in a strip without dog leg. Thus where the presence of angular displacement of the running strip has been recognized, the solution has involved complicated procedures and operations.

The present invention takes into account the possibility of the running strip being disposed at an angle to the longitudinal center line of the electroplating line equipment and by the simplest possible procedure and apparatus aligns the leading end of the new strip with the trailing end of the running strip to eliminate dog leg and lateral misalignment. By utilizing a substantially nondivergent beam of radiant energy disposable in parallel relation to the direction of movement of the running strip, the method and apparatus of application Ser. No. 677,170 is simplified.

SUMMARY OF THE INVENTION

The apparatus of the present invention is for use in connection with continuous strip processing equipment which has a longitudinal center line in the direction of strip movement through the equipment and which includes apparatus for aligning a longitudinal portion of the trailing end portion of a first strip with a longitudinal portion of the leading end portion of a second strip prior to the step of welding the strip end portions together, the present apparatus comprising first sensing means for sensing the position of one side edge of the first strip trailing end portion at a first point along the length of the first strip, second sensing means for sensing the position of the one side edge of the first strip trailing end portion at a second point along the length of the first strip spaced from the first point, means actuated in response to the positions indicated by the first and second means for generating a signal indicaby the first and second means for generating a signal indicative of the angle, if any, between the one side edge of the first strip trailing end portion and the strip processing equipment center line, radiant energy generating means for generating a substantially nondivergent beam of radiant energy, means actuated by the signal disposing the beam of radiant energy in a direction having a predetermined relation to the one side edge of the first strip trailing end portion, a strip positioning member having a plurality of linearly aligned strip engaging elements disposed along the length of one side edge of the second strip leading end portion, and means actuated in response to the direction of the beam of radiant energy for disposing the strip aligning elements of the positioning member at the same angle to the strip processing equipment center line as the angle between the one side edge of the first strip trailing end portion and the strip processing equipment center line, if any, whereby the second strip leading end portion one side edge can be brought into registry with the strip positioning member for aligning the longitudinal portion of the second strip leading end portion with the longitudinal portion of the first strip trailing end portion.

The present apparatus also includes means mounting the strip positioning member above described for movement toward and away from the one side edge of the second strip leading end portion without disturbing the angle the strip positioning member makes with the strip processing equipment center line, if any, in order to accommodate a second strip of different width than the first strip.

The method of the present invention is used in connection with continuous strip processing apparatus having a longitudinal center line in the direction of strip movement through the equipment and in which a longitudinal portion of the trailing end portion of a first strip is aligned with a longitudinal protion of the leading end portion of a second strip prior to the step of welding the strip end portions together, the method comprising sensing the position of one side edge of the first strip trailing end portion at a first point along the length of the first strip, sensing the position of the one side edge of the first strip trailing end portion at a second point along the length of the first strip spaced from the first point, generating a signal indicative the strips are to be welded, generating a signal indicative of the angle, if any, between the one side edge of the first strip trailing portion and the strip processing equipment center line, generating a substantially non-divergent beam of radiant energy, utilizing the signal to dispose the beam of radiant energy in a direction having a predetermined relation to the one side edge of the first strip trailing end portion, disposing a strip positioning member along the length of one side edge of the second strip leading end portion, and utilizing means responsive to the direction of the beam of radiant energy to dispose the positioning member at the same angle to the strip processing equipment center line as the angle between the one side edge of the first strip trailing end portion and the strip processing equipment center line, if any, whereby the second strip leading end portion one side edge can be brought into registry with the strip positioning member for aligning the longitudinal portion of the second strip leading end portion with the longitudinal portion of the first strip trailing end portion.

The method of the present invention further involves moving the strip positioning member toward and away from the one side edge of the second strip leading end portion without disturbing the angle the strip positioning member makes with the strip processing equipment center line, if any, to accommodate a second strip of different width than the first strip.

DETAILED DESCRIPTION OF THE PREFERRED EMBODIMENT OF APPARATUS AND THE PREFERRED VARIANT OF METHOD OF THE PRESENT INVENTION

Figure 1:
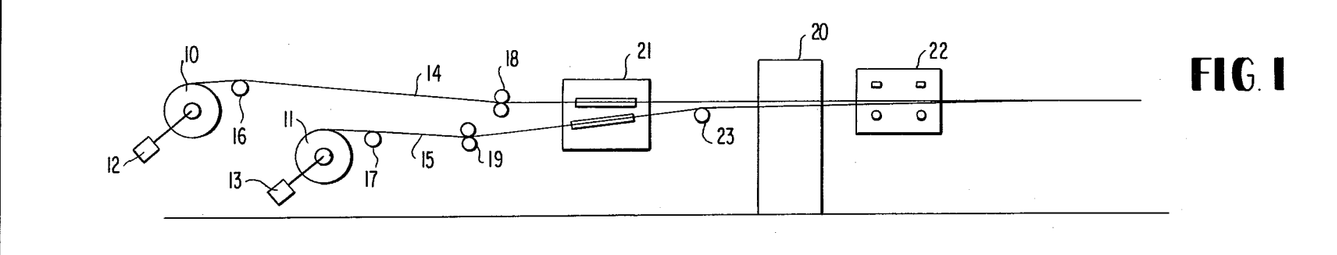
FIG. 1 is a diagrammatic view in side elevation of the uncoiling end of a conventional strip treating line illustrating the location of the apparatus components embodying the present invention and for carrying out the method of the present invention.

The strip handling equipment illustrated in FIG. 1 is conventional and comprises a pair of uncoilers 10 and 11 having power actuated means 12 and 13 for moving the coils in a direction normal to the center line of the strip processing equipment to position the uncoiling strip on or parallel to the longitudinal center line of the strip handling equipment. Strip 14 is shown coming off coil 10 and strip 15 coming off coil 11 with conventional guide rolls 16 and 17 respectively guiding the strips to respective pinch roll arrangements 18 and 19. A combined shear and welder is diagrammatically illustrated at 20. The locations of operating components of the present invention, more specifically described below, are diagrammatically illustrated at 21 and 22. Vertically movable roll 23 serves to position either incoming strip during the shearing and welding operations.

Figure 2:
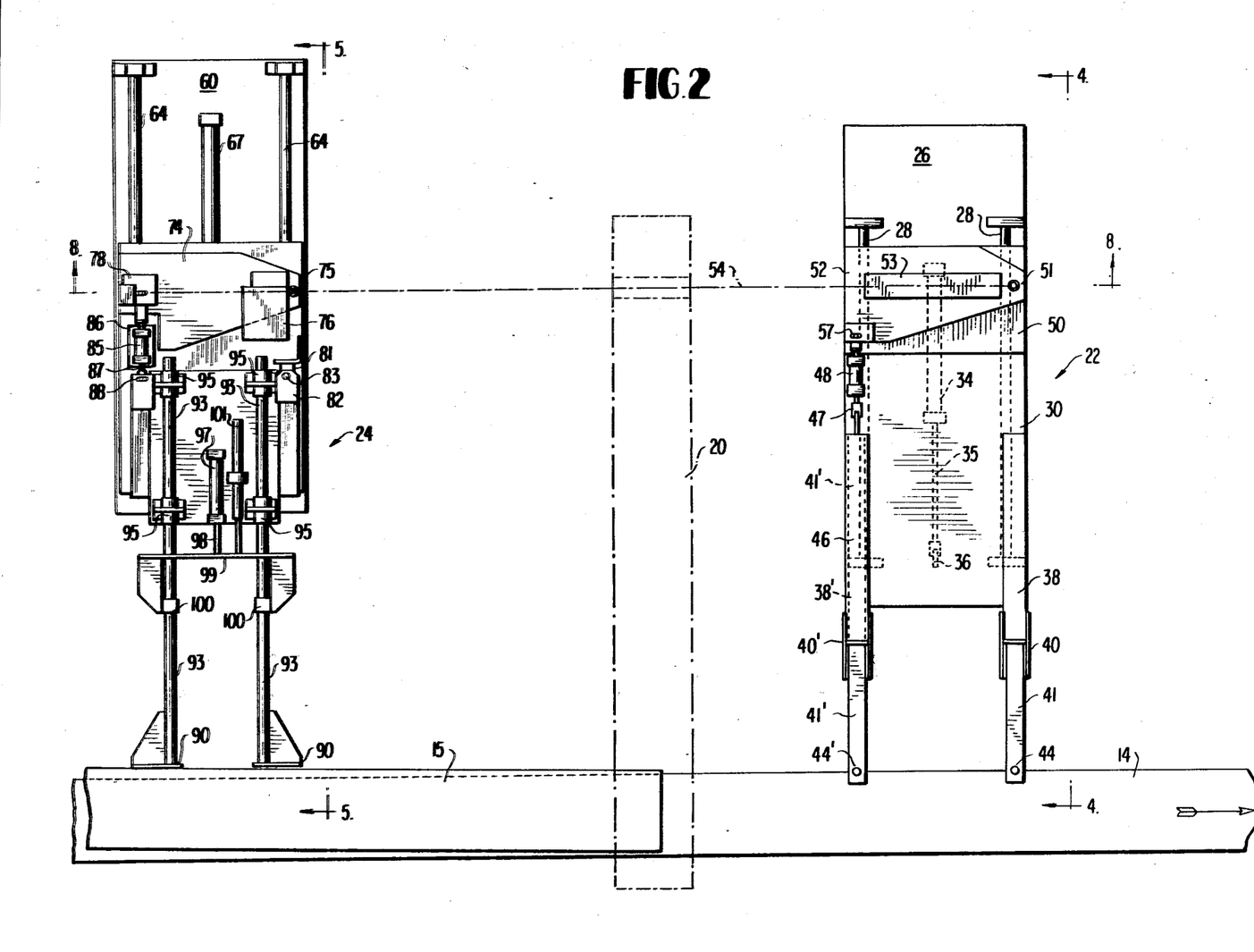
FIG. 2 is a plan view of apparatus embodying the present invention and for carrying out the method of the present invention.

Referring now to FIGS. 2 to 7, it will be assumed that strip 14 is uncoiling and running through the strip treating line and strip 15 has been threaded through pinch rolls 19 so that its leading end portion is ready to be sheared at the combined shear and welder 20. In FIG. 2 the leading end portion of strip 15 has been positioned relative to the longitudinal center line of the strip treating equipment by movement of coil 11 transversely of the line by power means 13, where this is necessary or desirable. In other words the leading end portion of strip 14 is positioned where desired by the operator relative to the center line of the strip treating equipment. FIG. 2 illustrates the trailing end portion of strip 14 skewed at an angle to the leading end portion of strip 15.

On the right hand side of welder 20 is shown the component, indicated generally by reference numeral 22, of applicant's invention which determines the direction of movement of the trailing end portion of strip 14 relative to the longitudinal center line of the strip treating equipment. This determination can be made continuously while the strip is running so that everything will be in readiness for a quick completion of the shearing and welding operation when running strip 14 is stopped for this purpose. On the left hand side of welder 20 is shown the component, indicated generally by reference numeral 24, of the present invention which makes possible positioning of the leading end portion of strip 15 in alignment with the direction of motion of strip 14. Component 22 senses the direction of movement of strip 14 and by the ingenious use of means for generating a substantially nondivergent radiant energy beam carried by component 22 and beam actuated means carried by component 24 on the other side of the welder, component 22 is enabled to transmit this information to component 24 where it is translated into positioning action of mechanical means which are used for aligning strip 15.

Figure 4:
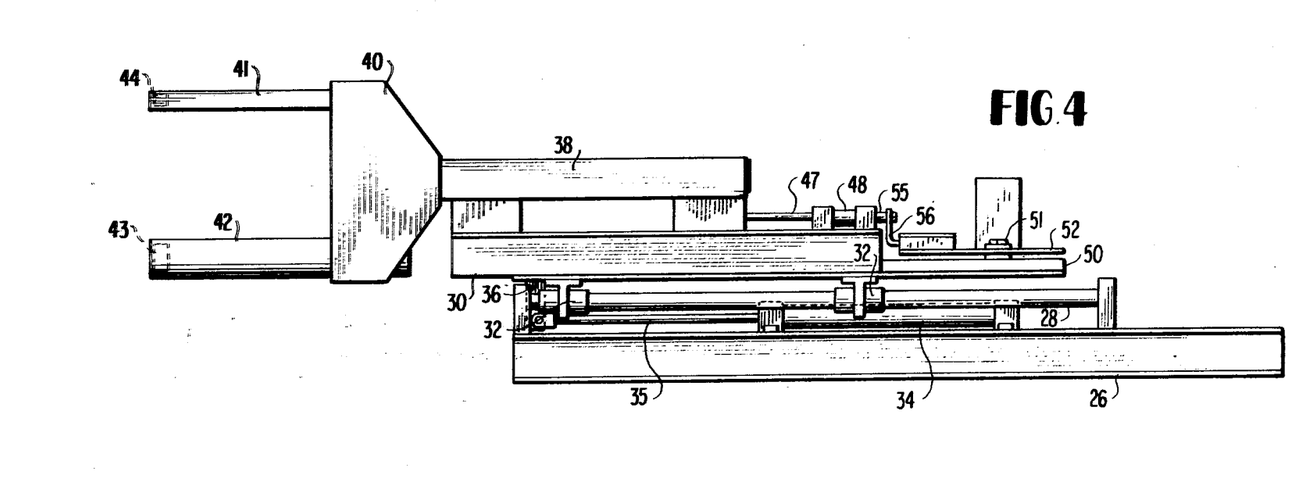
FIG. 4 is an end elevational view of the apparatus shown in FIG. 2 on the right hand side of the welder taken on the line 4—4 of FIG. 2.

Referring now to component 22 and FIGS. 2 and 4, this component is shown supported on a base 26 carrying tubular ways 28 on which is slidably mounted a carriage 30 by means of slidable sleeves 32. Carriage 30 is power actuated by a hydraulic cylinder 34 and piston 35, the cylinder being carried by base 26 and the piston 35 being connected to carriage 30 by post 36. By means of a superstructure 38 carriage 30 has rigidly mounted thereon a framework 40 having an upper arm 41 and a lower arm 42, these parts being shown on the right hand side of component 22 in FIG. 2. Arm 42 carries at its outer extremity a laser beam generator 43 directed upwardly and arm 41 at its outer extremity carries a laser receptor 44. Laser beam generator 43 and laser beam receptor 44 are utilized to sense the edge of strip 14 as indicated in FIG. 2 in a manner similar to the conventional photoelectric cell arrangement for this purpose but much more accurately due to the nondivergent characteristics of the laser beam. On the left hand side of carriage 30 in FIG. 2 a similar superstructure 38', frame 40, arms 41' and 42' and sensing means 43', 44' are provided, except that in this case frame 40' is mounted for movement relative to superstructure 38' by virtue of superstructure 38' having within it in telescoping relation a tubular member 46 which carries framework 40' and arms 41', 42'. The rear end of telescopically received element 46 is connected to the piston rod 47 of a hydraulic cylinder 48, the piston being actuatable to move frame 40' and arms 41', 42' a short distance relative to superstructure 38' and carriage 30.

At the rear end of carriage 30 there is a lowered shelf 50 which has pivotally mounted on it at pivot 51 a swingable tray 52. Tray 52 in turn has rigidly mounted on it a means 53 for generating a laser beam 54 of sustantially nondivergent form directed as shown in FIG. 2 through an opening in welder 20 toward component 24. Tray 52 is connected to arms 41', 42' by means of a second piston rod 55 connected to the opposite side of the piston of cylinder 48, a bracket 56 and a sliding pivot 57. It will be apparent that as the piston of hydraulic cylinder 48 actuates piston rod 47 to move arms 41', 42' toward and away from strip 14, piston rod 55 through bracket 56 and sliding pivot 57 will swing tray 52 a corresponding amount, Pivot 51 for tray 52 carrying laser generating means 53 and sensing laser beam elements 43, 44 are shown in the same vertical plane which plane is shown normal to the longitudinal center line of the strip handling equipment. Similarly sensing laser beam elements 43', 44' and the pin of sliding pivot 57 are shown in a vertical plane normal to the longitudinal center line of the strip handling equipment. With sensing laser beam elements 43', 44' and sensing laser beam elements 43', 44' in a plane parallel to the longitudinal center line of the strip treating equipment and the laser beam 54 emitted by generating means 53 parallel to the same longitudinal center line, movement of sensing laser beam elements 43', 44' relative to carriage 30 will result in corresponding movement of sliding pivot 57 and laser beam 54 will remain parallel to a vertical plane containing sensing laser elements 43, 44 and 43', 44'. It follows that where sensing laser elements 43, 44 and 43', 44' are following the edge of the running strip, laser beam 54 will remain parallel to the edge of the running strip.

Figure 5:
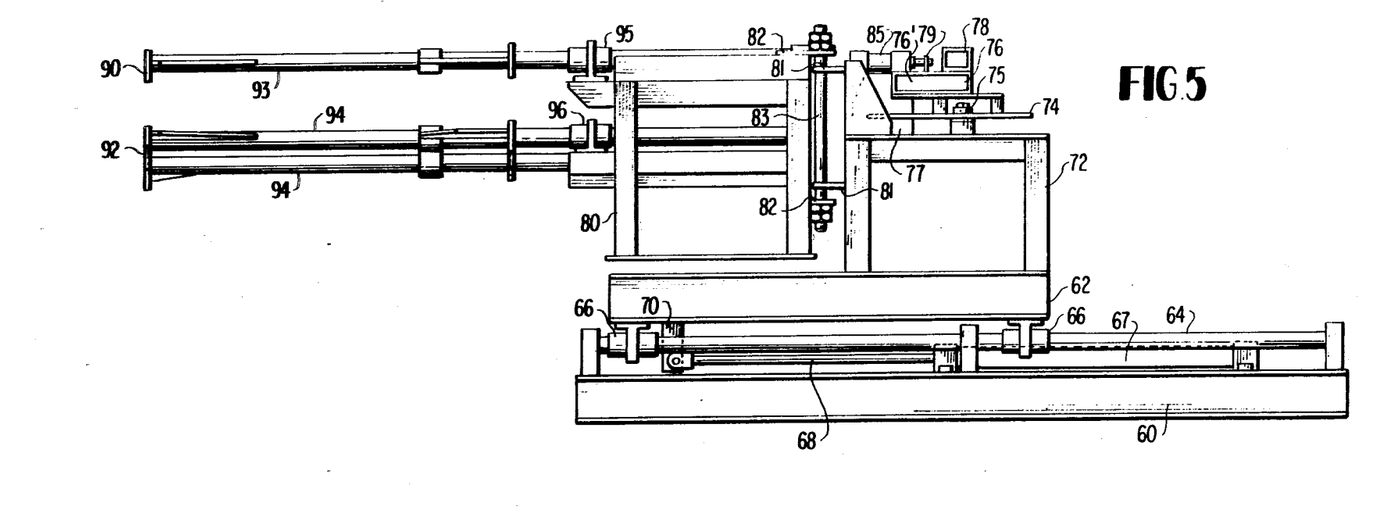
FIG. 5 is an end elevational view of the apparatus on the left side of the welder in FIG. 2 taken on the line 5—5 of FIG. 2.
Figure 6:
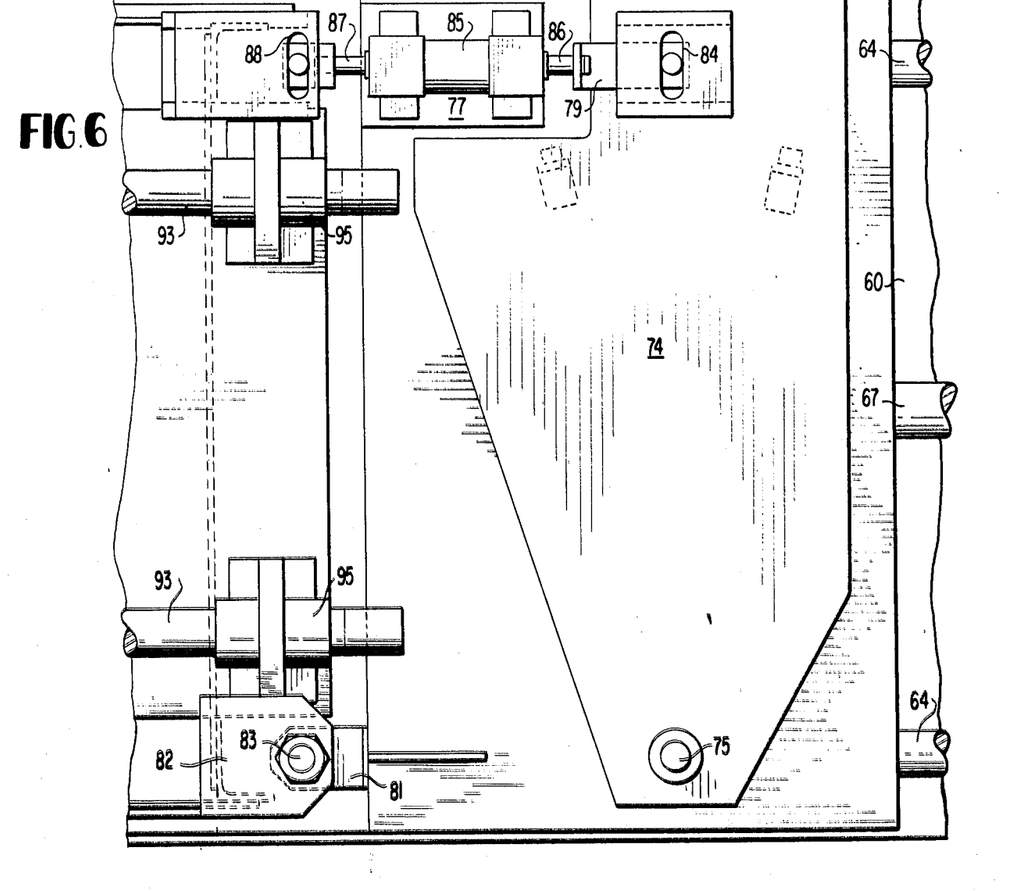
FIG. 6 is an enlarged fragmentary view in plan with parts removed for clarity of the structure of FIG. 5.
Figure 7:
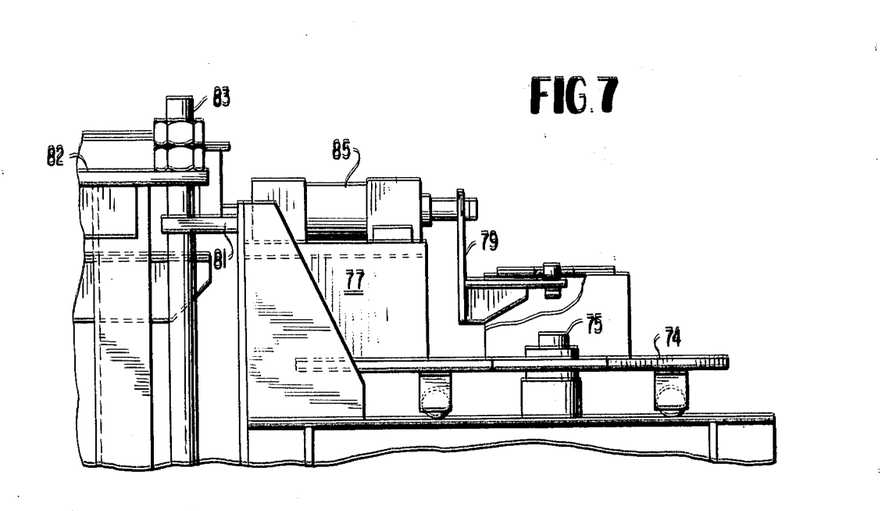
FIG. 7 is an enlarged fragmentary view in side elevation with parts removed for clarity of the structure of FIG. 5.
Figure 8:
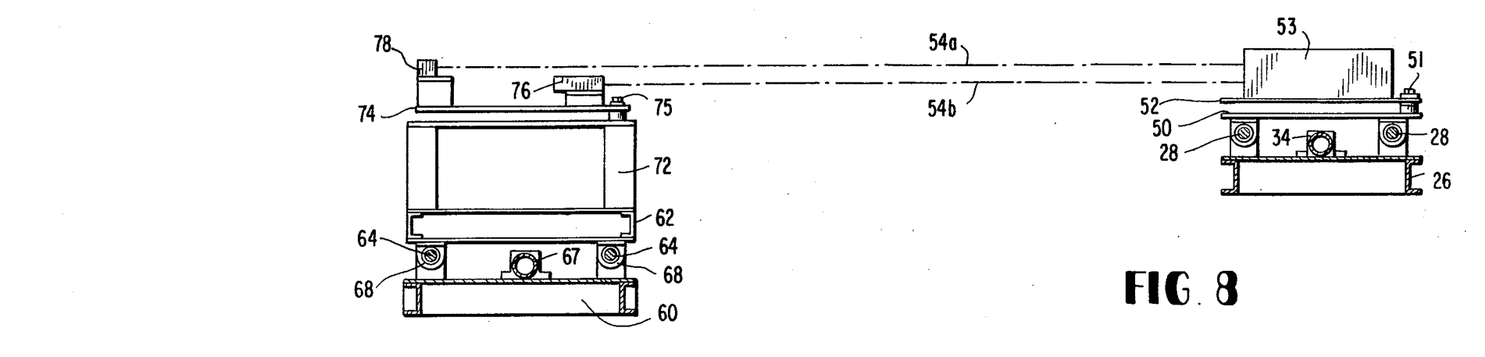
FIG. 8 is a view in section taken on the line 8—8 of FIG. 2.

Turning now to the component of applicant's invention indicated by reference numeral 24, as best shown in FIGS. 5, 6 and 7, component 24 is supported on a base 60 and includes a traveling carriage 62 mounted on tubular ways 64 through the medium of slidable sleeves 66. Movement of carriage 24 is effected by hydraulic cylinder 67, piston 68 and downwardly projecting post 70 carried by the underside of carriage 62. Carried at the rear of carriage 62 is a superstructure 72 which pivotally supports a horizontally disposed tray 74 on pivot 75. Tray 74 carries two laser beam receptors 76 and 78 which as best seen in FIG. 2 are at different distances from the source of laser beam 54 and as best shown in FIGS. 5 and 8 are at different elevations.

Also pivotally carried by superstructure 72 is a framework 80. Superstructure 72 includes a pair of brackets 81 and the framework 80 includes a cooperating pair of brackets 82,82, brackets 81 and 82 coacting with a shaft 83 to mount framework 80 pivotally on superstructure 72.

Supported on superstructure 72 by bracket 77 in close proximity to and mechanically connected to that portion of tray 74 which carries lasser beam receptor 78 is a hydraulic cylinder 85 having a single piston with piston rods 86 and 87 connected to the piston and projecting out of the two ends of the cylinder. As specifically illustrated in FIGS. 6 and 7 and as will be more specifically described hereunder, actuation of hydraulic cylinder 85 causes pivotal movement of tray 74 by piston rod 86 being connected to tray 74 by bracket 79 (FIG. 7) and sliding pivot 84 (FIG. 6). Concurrently piston rod 87, through its connection with sliding pivot 88 carried by framework 80, moves framework 80 pivotally around pivot shaft 83 (FIG. 6).

Carried by framework 80 are two sets of strip positioning members each of which has two linearly aligned strip engaging elements 90, 90 (see FIG. 5) for the upper strip 14 and elements 92, 92 for lower strip 15. These strip positioning members comprise tubular supports 93 and 94 respectively which carry the strip engaging elements at their ends. The terminology "linearly aligned strip engaging elements" as used in this specification and claims includes within its meaning a single, unitary member which engages the strip at two or more linearly ligned points. Tubular supports 93, 94 are slidingly received within sleeves 95 and 96, respectively, at the forward and rearward extremities of framework 80. Movement of strip aligning elements 90, 90 relative to framework 80 is brought about by hydraulic cylinder 97, the piston rod 98 of which acts on tubular supports 93 through the intermediacy of a frame 99 rigidly attached at 100, 100 to supports 93, 93. At 101 a position indicator for frame 99 is shown which emits a signal characteristic of the position of the strip alignment elements. It will be understood that this structure is duplicated for the lower support members 94.

An important feature of the present invention is the provision in laser beam generator 53 of means for splitting the beam, such as a prism and mirror so as to give two parallel, vertically spaced beams emanating from generator 53 to be received respectively by receptors 76 and 78. Although this is the preferred embodiment of the invention, it is conceivable that a single beam with two aligned receptors, the first one of which passes part of the beam could accomplish the same purpose. Any other source of radiant energy which emanates a substantially nondivergent beam can be used rather than a laser beam and whatever the substantially nondivergent radiant energy beam is, the application of the principle of utilizing a beam to achieve parallelism as in the preferred embodiment of the present invention will be obvious to those skilled in the art.

Figure 9:
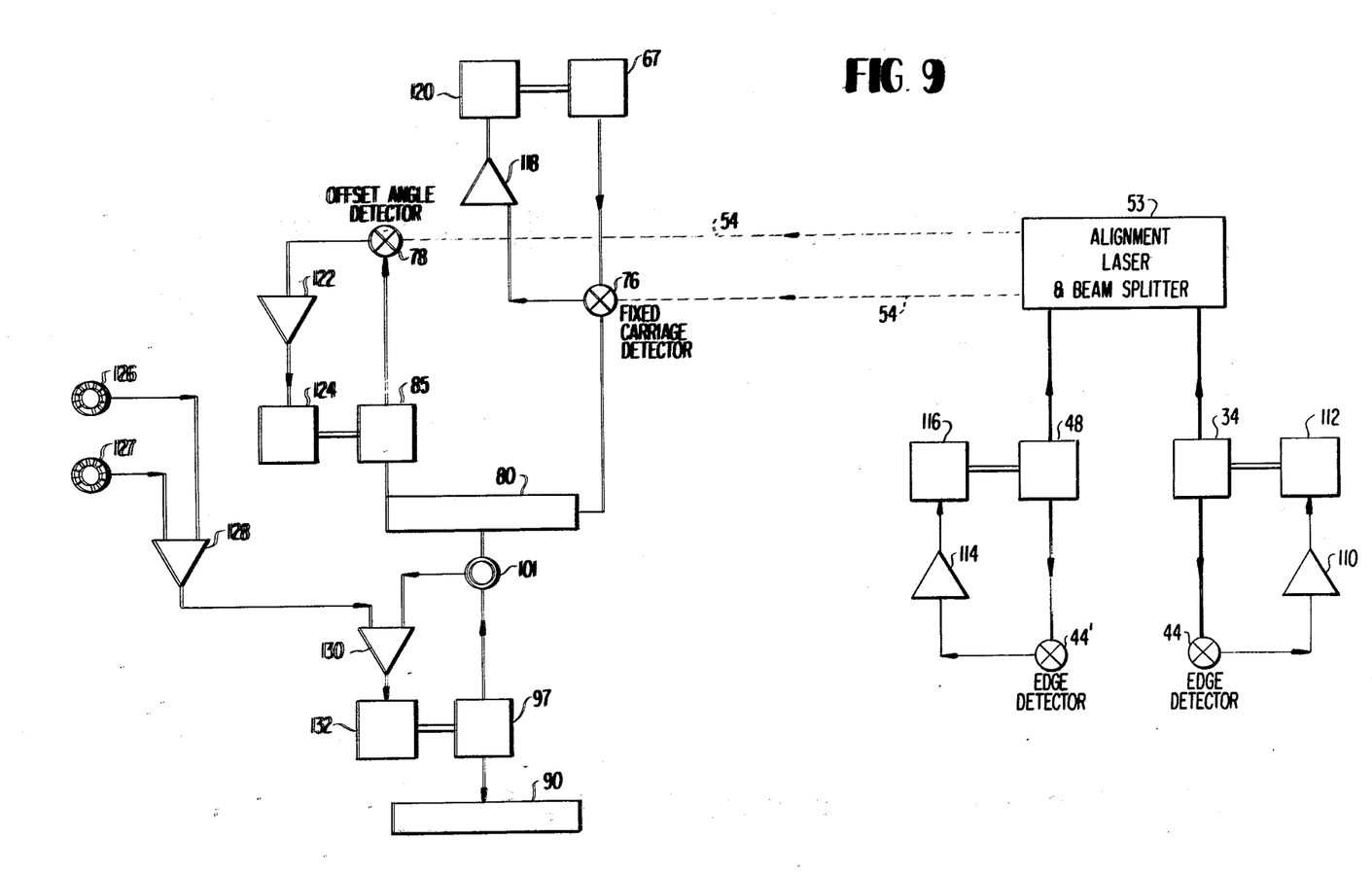
FIG. 9 is a block diagram showing the mechanical, hydraulic, electrical and radiant energy connections for the apparatus illustrated in FIGS. 2 through 6.

The operation of the apparatus of the present invention and the method of the present invention can best be understood from the following description taken in connection with the block diagram of FIG. 9 and FIGS. 2 to 8. In FIG. 9, where practicable, the same reference numerals have been used as those appearing in FIGS. 2 to 8.

Throughout the apparatus of the present invention, a laser receptor, when less than predetermined amount of the laser beam is intercepted, gives a signal which amplified operates a servo-valve in one direction and when more than a predetermined amount of the laser beam is intercepted, the laser receptor gives a signal which amplified operates the servo-valve to admit hydraulic fluid to the opposite side of the piston in the hydraulic cylinder. When the predetermined amount of laser beam is intercepted, as when the edge of the strip is being sensed, the laser detector gives no signal, the amplifier is inactive and the servo-valve is in a position which cuts off all hydraulic fluid to the cylinder involved.

Again, considering component 22, with strip end portion 14 running and strip end portion 15 ready to be fed into the line, if laser receptors 44 and 44' are not located over the edge of the strip where part of the radiant energy is intercepted, amplifier 110 activates servo-valve 112 to cause hydraulic cylinder 34 to move carriage 30 toward the strip until receptor 34 comes to the edge of the strip where a predetermined amount of light is intercepted by the edge of the strip. If the receptors are positioned so the strip intercepts all or more than the predetermined amount of light, cylinder 34 will move the detectors backwardly. In either case when the predetermined amount of light is intercepted amplifier 110 activates servo-valve 112 to cut off hydraulic fluid from cylinder 34 and carriage 30 stops moving. If laser detector or sensor 44' has not yet come to the edge of strip 14 with the preceding movement of carriage 30, amplifier 114 will activate servo-valve 116 to cause hydraulic fluid to operate cylinder 48 until laser detector 44' does come to the edge of strip 14.

AS will be apparent from the earlier description, laser beam generator 53 moves toward and away from the strip with carriage 30 and additionally may be moved angularly relative to carriage 30 by cylinder 48.

Assuming the split beam from laser beam generator 53 has its two components impinging on laser beam receptors 76 and 78, respectively, with the predetermined amount of light being intercepted by each detector, amplifiers 118 and 122 will be inactive and carriage 62 and frame 80 will remain stationary. Movement of carriage 30 away from the longitudinal center line of the strip processing equipment by virtue of movement of the edge of strip 14, will cause beam 54 to impinge less light on receptor 76, a signal which can for convenience be termed positive, will be emitted from receptor 76 and when amplified at 118 will cause servo-valve 120 to admit hydraulic fluid on the side of the piston of cylinder 67 which will cause carriage 62 to move away from the strips 14 and 15 until more light, the predetermined amount, again impinges on receptor 76. A fast movement of carriage 30 and beam 54 will not adversely affect this operation. When carriage 30 moves toward strip 14, receptor 76 begins to receive more light than the predetermined amount. This receptor thereupon emits a signal, which can for convenience be termed negative, which after amplification in amplifier 118 actuates servo-valve 120 to move the piston of cylinder 67 and thereby carriage 62 toward strips 14 and 15. However, if carriage 30 makes a movement toward strip 14 which is too rapid for the action of cylinder 67 to follow, receptor 76 would begin to have less light impinged on it with resulting reversal of the signal and reversal of movement of carriage 62 by cylinder 67. To obviate this malfunction of the device, the casing for receptor 76 is shown elongated in the direction toward the strip and in this extended portion 76' of the casing supplemental laser receptor equipment is housed and exposed to beam 54 so that beam 54 will continue to actuate receptor elements which will continue to emit the negative signal necessary for continued movement of carriage 62 in the proper direction. The rarity of this occurrence and the short stroke of cylinder 86 make it unnecessary to make provision for supplementing receptor 78 to prevent unwanted movement of frame 80.

During all the normal foregoing movements receptor 78 will emit neither positive nor negative signals so long as beam 54 remains parallel to the center line of the strip treating equipment because the receptor is carried along by carriage 62 with the laser beam continuing to impinge on it. When and if strip 14 takes a skewed position, beam 54 will assume the same skewed position and receptor 78 will emit a positive or negative signal depending upon which way the beam is skewed. Here again amplifier 122 will transmit the amplified signal to servo-valve 124 and the servo-valve will operate cylinder 86 in the proper direction, depending upon the skew of the beam and therefore the polarity of the signal. Actuation of cylinder 86 by servo-valve 124 not only moves tray 74 so that receptor 78 stays on beam 54 but since the same piston that actuates tray 74 also actuates frame 80 through sliding pivot 88, the strip aligning elements 90, 90 are positioned in parallel relation to strip 14.

As is well known in the art, strip processing lines handle different widths of strip and this further complicates the problems involved in connecting the trailing end portion of running strip with the leading end portion of a new strip where the two strips are of different widths. The present invention takes care of this problem in conjunction with handling the skew problem. First, the length of strokes of cylinders 34 and 67 are such that any width of strip between the minimum and the maximum for which the line is designed can be accommodated. It will be evident that the width of the running strip 14 automatically taken care of by component 22. Component 24 on the other hand has special structural features for adjusting to different width strips 15.

The location of carriage 62 relative to the center line of the strip treating equipment is controlled by the width of strip 14. Therefore differences in width of strip 15 must be taken care of by extension or retraction of supports 93 or 94. Cylinder 97 provides power for these movements. The stroke of hydraulic cylinder 97 is designed to be greater than one-half the maximum variation in strip width so that when frame 99 is all the way back, i.e., the piston of cylinder 97 is fully retracted, strip alignment elements 90, 90 will be spaced back slightly from the near edge of the widest strip 15 when in position to be lead into the line. To achieve this the operator, knowing the width of the new strip, sets dial 126 or 127, depending upon which pass line or strip 14 or 15 is being fed into the line. These dials feed a signal, the character of which depends upon their seting, into set point difference amplifier 128, the output of which amplifier and the signal from position indicator 101 being combined and the sun or difference fed into amplifier 130. The output of amplifier 130 controls servo-valve 132 which as described above in respect to the other servo-valves admits fluid to one side or the other of the piston of hydraulic cylinders 97 to move frame 99 to the proper position and to cut off fluid to the cylinder when the frame 99 is in the proper position.

By previous operation of the uncoiler involved, 10 or 11, and the power means for moving the coil transversely, 12 or 13, the leading end portion of the new strip has been moved up to the proximity of the shear and welder. When the linearly aligned strip engaging elements 90, 90 or 92, 92 for the leading end portion of the entering strip are in the proper position (the strip positioning member located at the pass line which is running strip is positioned back a few inches from the running strip), the leading end portion of the new strip is moved by an operator so as to be up against both linearly aligned strip engaging elements to thereby align the leading end portion of the incoming strip with the running strip at about the time the running strip is coming close to its trailing end. At about this time the running strip comes to its trailing end which trailing end is sheared and the welding operation proceeds.

Figure 3:
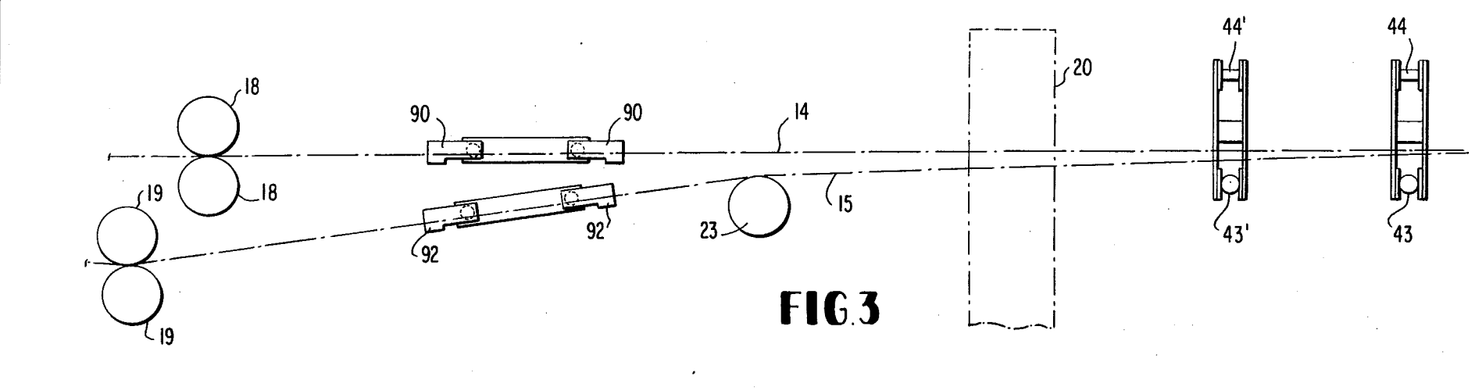
FIG. 3 is an enlarged diagrammatic view in side elevation of a portion of the apparatus illustrated in FIG. 1 more clearly showing the relative locations of the apparatus of FIG. 2.

It will be noted that component 24 in FIG. 2 is spaced back from the longitudinal center line of the strip processing equipment a greater distance than component 22. Instead of the leading end portion of the strip being manually positioned as just described, the apparatus of the present invention and the method provides for power positioning of the leading end portion of the strip. With this type of operation, entire component 24 is moved toward the longitudinal center line of the strip processing equipment until linearly aligned strip engaging elements 90, 90 and 92, 92 are on the far side of the strip from component 24 with the strip engaging alignment elements beyond the widest strip to be handled by the line. With this arrangement the rigid connection at 100 between frame 99 is freed so that frame 99 has sliding connection with tubular support members 93. An auxiliary hydraulic cylinder and frame (not shown) similar to cylinder 97 and frame 100, are connected to the rear portions of supports 93 and controls similar to those already described are utilized to actuate these two cylinders so as to take care of the width of strip and its position. Referring to FIG. 3, it will be apparent that portions of strip engaging alignment elements 90, 90 and parts of frame 99 will engage the strip and by means of the hydraulic cylinders described the strip can be properly positioned. Roll 23 can be moved up to bring strip 15 into supporting relation with strip 14 when the leading end portion of strip 14 is being fed into the line. Alternatively, tubular supports 93, 93 can pass under strip 14 with strip alignment elements 90, 90 shaped to engage the strip in that position.

Although the simplest form of the present invention involves disposing the substantially nondivergent beam of radiant energy parallel to the sensed edge of the running strip, the beam can obviously be disposed at a desired angle to the sensed edge and the remainder of the apparatus and method designed to compensate for this divergence of the beam.

The above described embodiment and variant of the invention are to be considered in all respects as illustrative and not restrictive since the invention may be embodied in other specific forms and carried out differently without departing from its spirit or essential characteristics. Therefore, the scope of the invention is indicated by the claims rather than by the foregoing description, and all changes which come within the meaning and range of the equivalents of the claims are intended to be embraced therein.

What is claimed is:

1. In continuous strip processing equipment having a longitudinl center line in the direction of strip movement through the equipment, apparatus for aligning a longitudinal portion of the trailing end portion of a first strip with a longitudinl portion of the leading end portion of a second strip prior to the step of welding the strip end portions together, the apparatus comprising first sensing means for sensing the position of one side edge of the first strip trailing end portion at a first point along the length of the first strip, second sensing means for sensing the position of the one side edge of the first strip trailing end portion at a second point along the length of the first strip spaced from the first point, means actuated in response to the positions indicated by the first and second means for generating a signal indicative of the angle, if any, between the one side edge of the first strip trailing end portion and the strip processing equipment center line, radiant energy generating means for generating a substantially nondivergent beam of radiant energy, means actuated by the signal disposing the beam of radiant energy in a direction having a predetermined relation to the one side edge of the first strip trailing end portion, a strip positioning member having a plurality of linearly aligned strip engaging elements disposed along one side edge of the second strip leading end portion, and radiant energy receptor actuated means responsive to the direction of the beam of radiant energy for disposing the strip engaging elements of the positioning member at the same angle to the strip processing equipment center line as the angle between the one side edge of the first strip trailing end portion and the strip processing equipment center line, if any, whereby the second strip leading end portion one side edge can be brought into registry with the strip engaging elements for aligning the longitudinal portion of the second strip leading end portion with the longitudinal potion of the first strip trailing end portion.

2. The apparatus of claim 1 in which the direction of the beam of radiant energy is parallel to the one side edge of the first strip trailing end portion.

3. The apparatus of claim 2 which includes adjustable means mounting the strip positioning member for movement toward and away from the one side edge of the second strip leading end portion without disturbing the angle the linearly aligned strip engaging elements of the strip positioning member make with the strip processing equipment center line, if any, in order to accommodate a second strip of different width than the first strip.

4. The apparatus of claim 3 including carriage means movable toward and away from the trailing end portion of the first strip, the first and second sensing means being mounted on the carriage, means mounting one of the sensing means on the carriage means for movement relative to the carriage means toward and away from the trailing end portion of the first strip, means fixedly mounting the other sensing means relative to the carriage means, first power means for moving the carriage means, second power means for moving said one of the sensing means relative to the carriage means, signal generating means associated with the first and second sensing means for actuating the first and second power means to cause the first and second sensing means to be positioned at the edge of the trailing end portion of the first strip, means mounting the radiant energy beam generating means on the carriage means for pivotal movement relative to the carriage means with the beam directed toward the radiant energy receptor actuated means, and means actuated in response to movement of said one of the sensing means for pivotally moving the radiant energy beam generating means.

5. The apparatus of claim 4 including a second carriage means movable toward and away from the leading end portion of the second strip, means mounting the strip positioning member on the second carriage means for pivotal movement relative to the second carriage means, the radiant energy receptor actuated means including, first radiant energy beam receptor means carried by the second carriage means and disposed for impingement thereon of the radiant energy beam, signal generating means associated with the first radiant energy beam receptor means for generating a signal indicative of movement of the radiant energy beam toward and away from the strip processing equipment center line, third power means for moving the second carriage, means responsive to the signal of the signal generating means for activating the third power means to move the second carriage means toward the strip, second radiant energy beam receptor means mounted for pivotal movement relative to the second carriage means, second signal generating means associated with the second radiant energy beam receptor means for generating a signal indicative of the angle the radiant energy beam makes, if any, with the longitudinal center line of the strip processing equipment, fourth power means for moving the strip positioning member pivotally relative to the second carriage means, means responsive to the signal of the second signal generating means for activating the fourth power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

6. The apparatus of claim 2 including carriage means movable toward and away from the trailing end portion of the first strip, the first and second sensing means being mounted on the carriage, means mounting one of the sensing means on the carriage means for movement relative to the carriage means toward and away from the trailing end portion of the first strip, means fixedly mounting the other sensing means relative to the carriage means, first power means for moving the carriage means, second power means for moving said one of the sensing means relative to the carriage means, signal generating means association with the first and second sensing means for actuating the first and second power means to cause the first and second sensing means to be positioned at the edge of the trailing end portion of the first strip, means mounting the radiant energy beam generating means on the carriage means for pivotal movement relative to the carriage means with the beam directed toward the radiant energy receptor actuated means, and means actuated in response to movement of said one of the sensing means for pivotally moving the radiant energy beam generating means.

7. The apparatus of claim 6 including a second carriage means movable toward and away from the leading end portion of the second strip, means mounting the strip positioning member on the second carriage means for pivotal movement relative to the second carriage means, the radiant energy receptor actuated means including, first radiant energy beam receptor means carried by the second carriage means and disposed for impingement thereon of the radiant energy beam, signal generating means association with the first radiant energy beam receptor means for generating a signal indicative of movement of the radiant energy beam toward and away from the strip processing equipment center line, third power means for moving the second carriage, means responsive to the signal of the signal generating means for activating the third power means to move the second carriage means toward the strip, second radiant energy beam receptor means mounted for pivotal movement relative to the second carriage means, second signal generating means associated with the second radiant energy beam receptor means for generating a signal indicative of the angle the radiant energy beam makes, if any, with the longitudinal center line of the strip processing equipment, fourth power means for moving the strip positioning member pivotally relative to the second carriage means, means responsive to the signal of the second signal generating means for activating the fourth power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

8. The apparatus of claim 7 which includes adjustable means mounting the strip positioning member for movement of the strip positioning member relative to the carriage means toward and away from the strip processing equipment center line, power means for moving the adjustable means, manual control means settable to a desired strip width, means acting between the manual control means and the last claimed power means activating the last claimed power means to move the strip positioning member to a position contiguous to a strip of the desired width.

9. The apparatus of claim 2 including a carriage means movable toward and away from the leading end portion of the second strip, means mounting the strip positioning member on the carriage means for pivotal movement relative to the carriage means, the radiant energy receptor actuated means including, first radiant energy beam receptor means carried by the carriage means and disposed for impingement thereon of the radiant energy beam, signal generating means associated with the first radiant energy beam receptor means for generating a signal indicative of movement of the radiant energy beam toward and away from the strip processing equipment center line, first power means for moving the carriage, means responsive to the signal of the signal generating means for activating the first power means to move the carriage means toward the strip, second radiant energy beam receptor means mounted for pivotal movement relative to the carriage means, second signal generating means associated with the second radiant energy beam receptor means for generating a signal indicative of the angle the radiant energy beam makes, if any, with the longitudinal center line of the strip processing equipment, second power means for moving the strip positioning member pivotally relative to the second carriage means, means responsive to the signal of the second signal generating means for activating the second power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

10. The apparatus of claim 9 which includes adjustable means mounting the strip positioning member for movement of the strip positioning member relative to the carriage means toward and away from the strip processing equipment center line, power means for moving the adjustable means, manual control means settable to a desired strip width, means acting between the manual control means and the last claimed power means activating the last claimed power means to move the strip positioning member to a position contiguous to a strip of the desired width.

11. The apparatus of claim 1 including carriage means movable toward and away from the trailing end portion of the first strip, the first and second sensing means being mounted on the carriage, means mounting one of the sensing means on the carriage means for movement relative to the carriage means toward and away from the trailing end portion of the first strip, means fixedly mounting the other sensing means relative to the carriage means, first power means for moving the carriage means, second power means for moving said one of the sensing means relative to the carriage means, signal generating means associated with the first and second sensing means for actuating the first and second power means to cause the first and second sensing means to be positioned at the edge of the trailing end portion of the first strip, means mounting the radiant energy beam generating means on the carriage means for pivotal movement relative to the carriage means with the beam directed toward the radiant energy receptor actuated means, and means actuated in response to movement of said one of the sensing means for pivotally moving the radiant energy beam generating means.

12. The apparatus of claim 11 including a second carriage means movable toward and away from the leading end portion of the second strip, means mounting the strip positioning member on the second carriage means for pivotal movement relative to the second carriage means, the radiant energy receptor actuated means including, first radiant energy beam receptor carried by the second carriage means and disposed for impingement thereon of the radiant energy beam, signal generating means associated with the first radiant energy beam receptor means for generating a signal indicative of movement of the radiant energy beam toward and away from the strip processing equipment center line, third power means for moving the second carriage, means responsive to the signal of the signal generating means for activating the third power means to move the second carriage means toward the strip, second radiant energy beam receptor means mounted for pivotal movement relative to the second carriage means, second signal generating means associated with the second radiant energy beam receptor means for generating a signal indicative of the angle the radiant energy beam makes, if any, with the longitudinal center line of the strip processing equipment, fourth power means for moving the strip positioning member pivotally relative to the second carriage means, means responsive to the signal of the second signal generating means for activating the fourth power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

13. The apparatus of claim 12 which includes adjustable means mounting the strip positioning member for movement of the strip positioning member relative to the carriage means toward and away from the strip processing equipment center line, power means for moving the adjustable means, manual control means settable to a desired strip width, means acting between the manual control means and the last claimed power means activating the last claimed power means to move the strip positioning member to a position contiguous to a strip of the desired width.

14. The apparatus of claim 1 including a carriage means movable toward and away from the leading end portion of the second strip, means mounting the strip positioning member on the carriage means for pivotal movement relative to the carriage means, the radiant energy receptor actuated means including, first radiant energy beam receptor means carried by the carriage means and disposed for impingement thereon of the radiant energy beam, signal generating means associated with the first radiant energy beam receptor means for generating a signal indicative of movement of the radiant energy beam toward and away from the strip processing equipment center line, first power means for moving the carriage, means responsive to the signal of the signal generating means for activating the first power means to move the carriage means toward the strip, second radiant energy beam receptor means mounted for pivotal movement relative to the carriage means, second signal generating means associated with the second radiant energy beam receptor means for generating a signal indicative of the angle the radiant energy beam makes, if any, with the longitudinal center line of the strip processing equipment, second power means for moving the strip positioning member pivotally relative to the second carriage means, means responsive to the signal of the second signal generating means for activating the second power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

15. The apparatus of claim 14 which includes adjustable means mounting the strip positioning member for movement of the strip positioning member relative to the carriage means toward and away from the strip processing equipment center line, power means for moving the adjustable means, manual control means settable to a desired strip width, means acting between the manual control means and the last claimed power means activating the last claimed power means to move the strip positioning member to a position contiguous to a strip of the desired width.

16. The apparatus of claim 1 which includes adjustable means mounting the strip positioning member for movement of the strip positioning member relative to the cariage means toward and away from the strip processing equipment center line, power means for moving the adjustable means, manual control means settable to a desired strip width, means acting between the manual control means and the last claimed power means activating the last claimed power means to move the strip positioning member to a position contiguous to a strip of the desired width.

17. The apparatus of claim 1 which includes adjustable means mounting the strip positioning member for movement toward and away from the one side edge of the second strip leading end portion without disturbing the angle the linearly aligned strip engaging elements of the strip positioning member make with the strip processing equipment center line, if any, in order to accommodate a second strip of different width than the first strip.

18. The apparatus of claim 17 including carriage means movable toward and away from the trailing end portion of the first strip, the first and second sensing means being mounted on the carriage, means mounting one of the sensing means on the carriage means for movement relative to the carriage means toward and away from the trailing end portion of the first strip, means fixedly mounting the other sensing means relative to the carriage means, first power means for moving the carriage means, second power means for moving said one of the sensing means relative to the carriage means, signal generating means associated with the first and second sensing means for actuating the first and second power means to cause the first and second sensing means to be positioned at the edge of the trailing end portion of the first strip, means mounting the radiant energy beam generating means on the carriage means for pivotal movement relative to the carriage means with the beam directed toward the radiant energy receptor actuated means, and means actuated in response to movement of said one of the sensing means for pivotally moving the radiant energy beam generating means.

19. The apparatus of claim 18 including a second carriage means movable toward and away from the leading end portion of the second strip, means mounting the strip positioning member on the second carriage means for pivotal movement relative to the second carriage means, the radiant energy receptor actuated means including, first radiant energy beam receptor means carried by the second carriage means and disposed for impingement thereon of the radiant energy beam, signal generating means associated with the first radiant energy beam receptor means for generating a signal indicative of movement of the radiant energy beam toward and away from the strip processing equipment center line, third power means for moving the second carriage, means responsive to the signal of the signal generating means for activating the third power means to move the second carriage means toward the strip, second radiant energy beam receptor means mounted for pivotal movement relative to the second carriage means, second signal generating means associated with the second radiant energy beam receptor means for generating a signal indicative of the angle the radiant energy beam makes, if any, with the longitudinal center line of the strip processing equipment, fourth power means for moving the strip positioning member pivotally relative to the second carriage means, means responsive to the signal of the second signal generating means for activating the fourth power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

20. In continuous strip processing equipment having a longitudinal center line in the direction of strip movement through the equipment, apparatus for aligning a longitudinal portion of the trailing end portion of a first strip with a longitudinal portion of the leading end portion of a second strip prior to the step of welding the strip end portions together, the apparatus comprising
first sensing means for sensing the position of one side edge of the first strip trailing end portion at a point along the length of the first strip nearer to the point where the strips are to be welded,
second sensing means for sensing the position of the one side edge of the first strip trailing end portion at a point along the length of the frist strip farther from the point where the strips are to be welded,
mounting means mounting the first sensing means for movement in a direction normal to the longitudinal center line of the strip processing equipment,
means acting between the first sensing means and the mounting means causing the mounting means to maintain the first sensing means in the edge sensing position relative to the one side edge of the first strip trailing end portion,
second mounting means mounting the second sensing means for movement relative to the mounting means in a direction normal to the center line of the strip processing equipment,
means acting between the second sensing means and the end mounting means causing the second mounting means to maintain the second sensing means in edge sensing position relative to the one side edge of the first strip trailing end portion,
radiant energy beam generating means for generating a substantially nondivergent beam of radiant energy, the radiant energy beam generating means having an axis of alignment and a free end portion,
pivot means at a point spaced along the alignment axis from the free end portion, the pivot means being fixedly mounted relative to the first sensing means and mounting the radiant energy beam generating means for rotational movement,
means connecting the second sensing means with the free end portion of the radiant energy beam generating means for causing the free end portion of the radiant energy beam generating means to follow movement of the second sensing means,
a strip positioning member having a plurality of linearly aligned strip engaging elements disposed along one side edge of the second strip leading end portion, and
radiant energy receptor actuated means responsive to the direction of the beam of radiant energy for disposing the strip engaging elements of the positioning member at the same angle to the strip processing equipment center line as the angle between the one side edge of the first strip trailing end portion and the strip processing equipment center line, if any, whereby the second strip leading end portion one side edge can be brought into registry with the strip engaging elements for aligning the longitudinal portion of the second strip leading end portion with the longitudinal portion of the first strip trailing end portion.

21. The apparatus of claim 20 including
a carraige means movable toward and away from the leading end portion of the second strip,
means mounting the strip positioning member on the carriage means for pivotal movement relative to the carriage means,
the radiant energy receptor actuated means including,
first radiant energy beam receptor means carried by the carriage means and disposed for impingement thereon of the radiant energy beam,
signal generating means associated with the first radiant energy beam receptor means for generating a signal indicative of movement of the radiant energy beam toward and away from the strip processing equipment center line,
first power means for moving the carriage,
means responsive to the signal of the signal generating means for activating the first power means to move the carriage means toward the strip,
second radiant energy beam receptor means mounted for pivotal movement relative to the carriage means,
second signal generating means associated with the second radiant energy beam receptor means for generating a signal indicative of the angle the radiant energy beam makes, if any, with the longitudinal center line of the strip processing equipment,
second power means for moving the strip positioning member pivotally relative to the second carriage means,
means responsive to the signal of the second signal generating means for activating the second power means to dispose the strip engaging elements of the strip positioning member at the same angle between the one side edge of the first strip trailing end portion and the strip processing equipment center line, if any, whereby the second strip leading end portion one side edge can be brought into registry with the strip positioning member for aligning the second strip leading end portion with the first strip trailing end portion.

22. The apparatus of claim 20 which includes
adjustable means mounting the strip positioning member for movement of the strip positioning member relative to the carriage means toward and away from the strip processing equipment center line,
power means for moving the adjustable means,
manual control means settable to a desired strip width,
means acting between the manual control means and the last claimed power means activating the last claimed power means to move the strip positioning member to a position contiguous to a strip of the desired width.

23. In continuous strip handling utilizing apparatus having a longitudinal center line in the direction of strip movement through the apparatus where a longitudinal portion of the trailing end portion of a first strip is aligned with a longitudinal portion of the leading end portion of a second strip prior to the step of welding the strip end portions together, the method comprising sensing the position of one side edge of the first strip trailing end portion at a first point along the length of the first strip, sensing the position of the one side edge of the first strip trailing end portion at a second point along the length of the first strip spaced from the first point, generating a signal indicative of the angle, if any, between the one side edge of the first strip trailing portion and the strip processing equipment center line, generating a substantially nondivergent beam of radiant energy, utilizing the signal to dispose the beam of radiant energy in a direction having a predetermined relation to the one side edge of the first strip trailing end portion, disposing a strip positioning member having linearly aligned strip engaging elements along the length of one side edge of the second strip leading end portion, and utilizing means responsive to the direction of the beam of radiant energy to dispose the linearly aligned strip engaging elements of the positioning member at the same angle to the strip processing equipment center line as the angle between the one side edge of the first strip trailing end portion and the strip processing equipment center line, if any, whereby the second strip leading end portion one side edge can be brought into registry with the strip positioning member for aligning the longitudinal portion of the second strip leading end portion with the longitudinal portion of the first strip trailing end portion.

24. The method of claim 23 including moving the strip positioning member toward and away from the longitudinal center line of the apparatus without disturbing the angle, if any, the strip positioning member makes with the strip processing apparatus center line, to adjust for the second strip being of different width than the first strip.

* * * * *